United States Patent [19]
Van Gorder

[11] 3,937,104
[45] Feb. 10, 1976

[54] POWER TRAIN INCLUDING A TORQUE-PRESSURE TRANSDUCER
[75] Inventor: Jack H. Van Gorder, Chelsea, Mich.
[73] Assignee: General Motors Corporation, Detroit, Mich.
[22] Filed: July 11, 1974
[21] Appl. No.: 487,775

[52] U.S. Cl. .............. 74/732; 192/.034; 192/3.33; 192/56 F; 251/253
[51] Int. Cl.² .................. F16H 47/00; F16D 23/00; F16D 33/00; F16K 31/44
[58] Field of Search ............... 192/3.33, .034, 56 F; 74/732, 731; 251/253

[56] References Cited
UNITED STATES PATENTS

| | | | |
|---|---|---|---|
| 2,963,134 | 12/1960 | Banner | 192/56 F |
| 3,520,392 | 7/1970 | Deremo et al. | 192/.034 X |
| 3,537,553 | 11/1970 | Olsen | 192/3.33 |
| 3,719,259 | 3/1973 | Burcz et al. | 192/56 F X |

Primary Examiner—Samuel Scott
Assistant Examiner—P. S. Lall
Attorney, Agent, or Firm—John P. Moran

[57] ABSTRACT

An automatic transmission power train including an improved torque-pressure transducer incorporating dual concentric outer turbine and inner transducer shafts, secured together at their input ends, and having a regulating valve mounted in the center of their output ends, with the axial movement of the regulating valve being controlled by a plurality of spring-loaded, axially aligned cam members, each having oppositely disposed tabs formed thereon for alternately extending through one set or both sets of oppositely disposed relatively movable longitudinal slots formed in the two shafts, with the spread of the cam members being changed by camming action in response to the relative twists of the concentric shafts, and the regulated transducer pressure thus produced being directed to a modulator valve assembly for transmittal to the conventional transmission shift valves.

4 Claims, 8 Drawing Figures

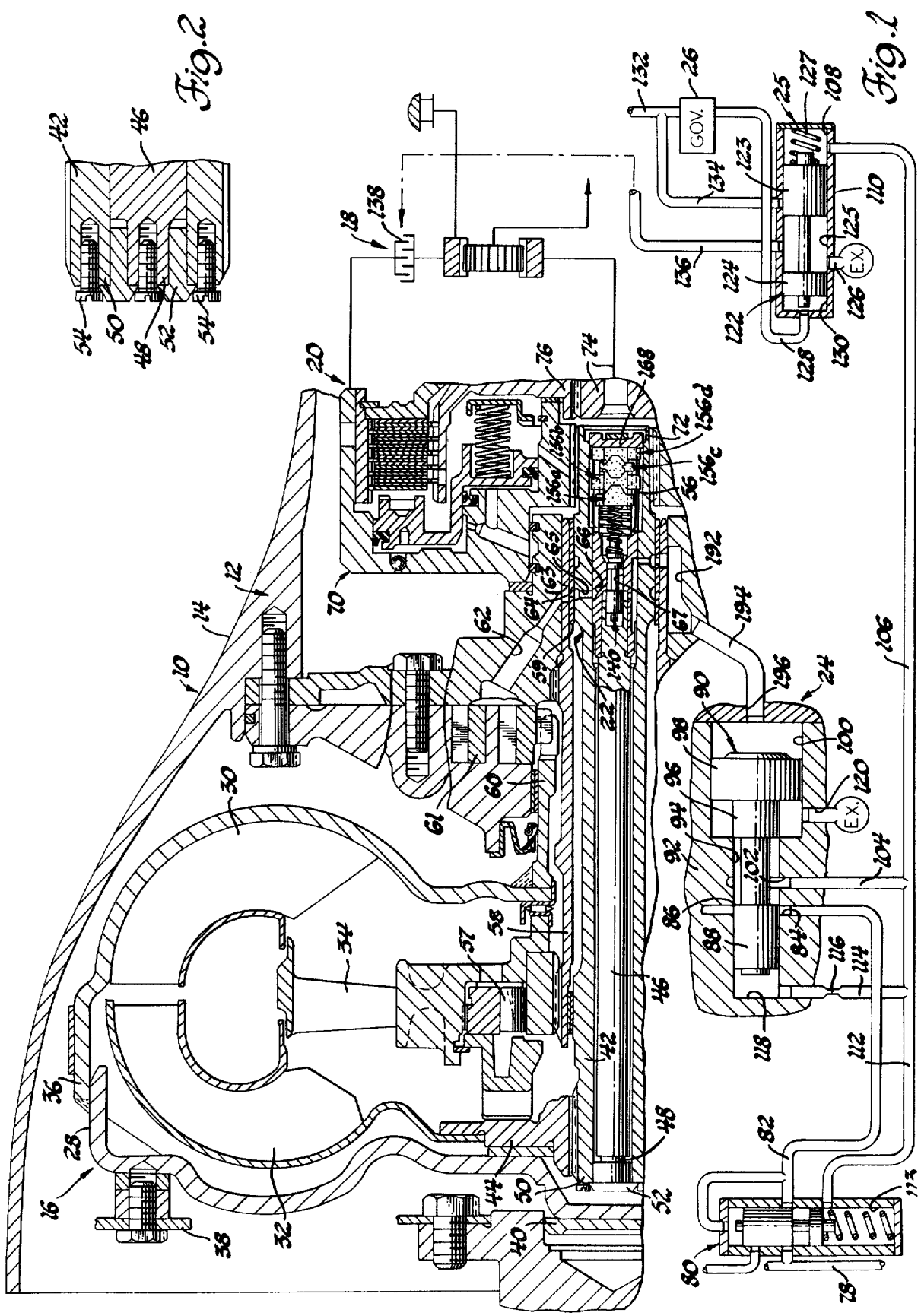

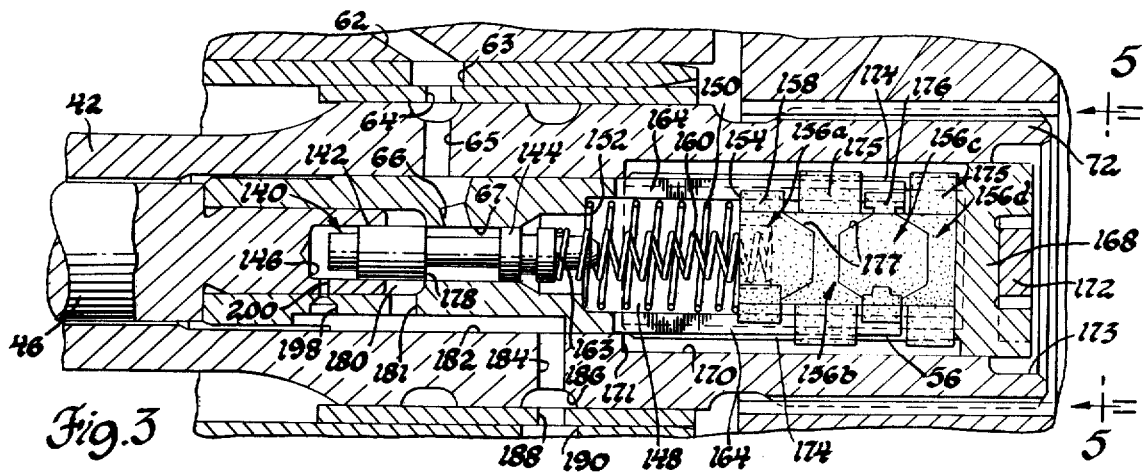
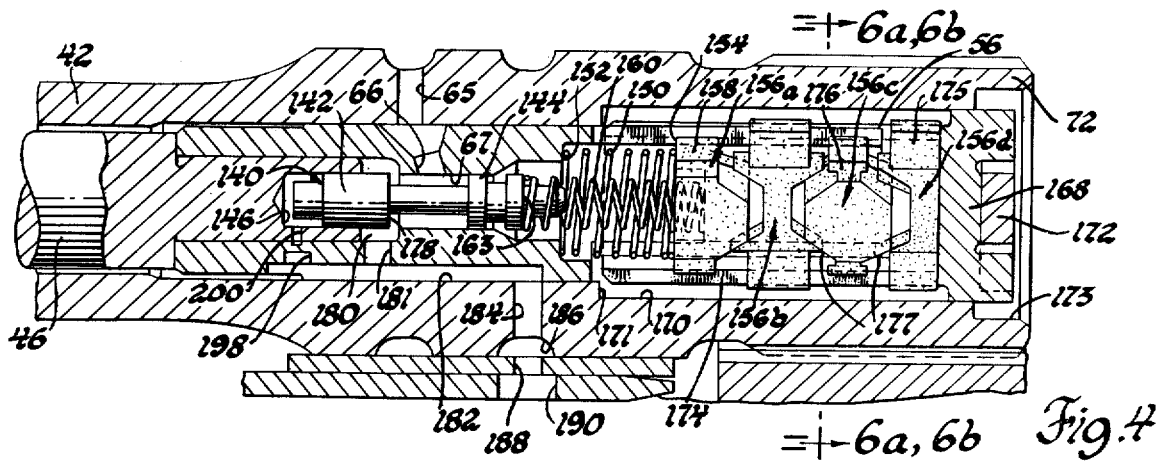
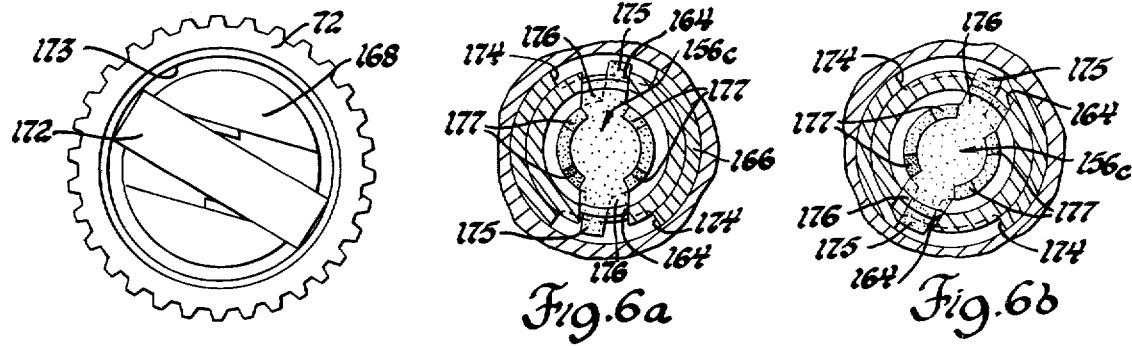
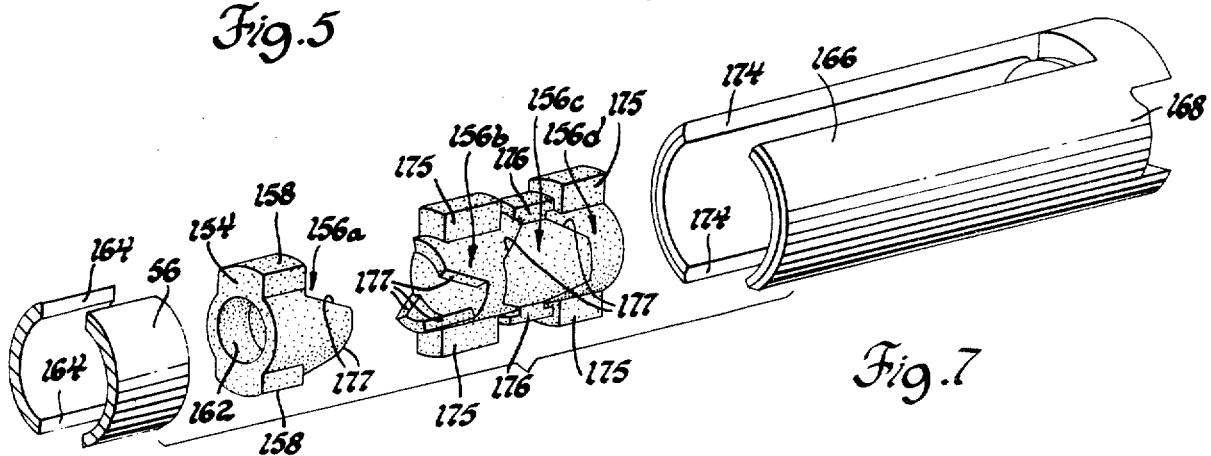

POWER TRAIN INCLUDING A TORQUE-PRESSURE TRANSDUCER

This invention relates generally to automatic transmissions for motor vehicles and, more particularly, to a novel means for measuring the torque involved therein.

Heretofore it has been a common practice to communicate manifold pressure or engine vacuum from the engine through a line to a vacuum modulator valve in order to influence the fluid pressure being delivered to the 1-2 and 2-3 shift valves of an automatic transmission in accordance with torque demand. While this is proper for most power trains, it is sometimes deemed desirable to utilize a signal which is more accurately representative of the actual torque being transmitted, particularly with the advent of engine exhaust emission control devices, and their influence on various motor vehicle engines. In lieu of using engine manifold vacuum to generate the torque signal, mechanical throttle angle indicators have been used on still other transmissions.

A prior patent, namely, U.S. Pat. No. 3,537,553, issued in the name of Howard E. Olsen on Nov. 3, 1970, illustrates a dual concentric shaft arrangement wherein one of the shafts—the outer or turbine shaft, is secured at its input end to the converter-driven member or turbine and is restrained at its output end by a connection with the forward clutch assembly, and the other or inner shaft thereof is secured at one end to the input end of the turbine shaft and has its other end free to rotate relative to the restrained end of the turbine shaft, the relative movement therebetween being substantially directly proportional to torque. A valve arrangement operates in conjunction with the dual shaft arrangement to convert the relative physical movements of the two shafts into a fluid pressure signal representative of shaft twist, or torque.

A general object of the invention is to provide an improved dual shaft and associated valving torque transducer means for producing a fluid pressure signal which accurately represents a converter's output torque to an automatic transmission.

Another object of the invention is to provide such an improved concentric dual shaft and valving means which includes a closed loop regulating or pressure-reducing valve slidably mounted in the inner transducer shaft and having a multiple-cam arrangement operatively connected between a fixed end of the outer turbine shaft and the free end of the inner transducer shaft for actuating the regulating valve linearly in response to the relative rotational movements of the two shafts, and a closed loop modulating valve adapted to respond to the transducer pressure changes resulting from the linear movement of the regulating valve, to provide a modulator pressure for signaling conventional 1-2 and/or 2-3 shift valves.

These and other objects and advantages of the invention will be apparent when reference is made to the following description and accompanying drawings, wherein:

FIG. 1 is a fragmentary cross-sectional view of an automatic transmission power train embodying the inventive torque-pressure transducer;

FIG. 2 is an enlarged fragmentary cross-sectional view of a portion of the FIG. 1 structure;

FIGS. 3 and 4 are enlarged fragmentary cross-sectional views of a portion of the FIG. 1 structure in different operating positions;

FIG. 5 is a cross-sectional view taken along the plane of line 5—5 of FIG. 3, and looking in the direction of the arrows;

FIGS. 6a and 6b are fragmentary corss-sectional views taken along the plane of lines 6a-bb of FIG. 4, and looking in the direction of the arrows, illustrating two different operational positions of the components involved; and FIG. 7 is an exploded perspective view of portions of the FIG. 3 structure.

Referring to the drawings in greater detail, FIG. 1 illustrates a power train 10 including a transmission 12 having a fixed housing 14, a torque converter assembly 16, a planetary gear system 18, a one-way clutch 20, a torque transducer 22, a closed-loop modulator or pressure-reducing valve assembly 24, a shift valve assembly 25, and a governor 26. The converter assembly 16 includes a cover or drum 28 adjacent a converter pump 30, a turbine 32 and a variable pitch stator or reactor 34 mounted therein. The drum 28 is welded to the pump 30 to form the sealed torque converter housing 36 which is driven by a conventional flexplate 38 fixedly secured to the transmission housing 14 and the engine crankshaft [not shown]. A cylindrical plate member 40 is welded to the drum 28 to form a pilot bearing which fits into the conventional end-bore of the crankshaft. A hollow turbine shaft 42 is splined to a hub 44 of the turbine 32. An inner transducer shaft 46 is secured at the input end 48 thereof to the input end 50 of the turbine shaft 42 by any suitable means, such as a cap 52 and bolts 54 (FIG. 2), and is otherwise slip-fitted within the hollow turbine shaft 42, the output end 56 of the transducer shaft 46 being a sleeve secured to the shaft 46 proper and being free to turn therein with respect to the turbine shaft 42. The variable pitch stator 34 is connected by a one-way brake 57 and a ground sleeve 58 to the fixed transmission housing 14. A sleeve 59 is secured intermediate the inner surface of the ground sleeve 58 and the adjacent outer surface of the turbine shaft 42.

The converter pump 30 is connected by a sleeve 60 to drive a transmission pump 61 which thereupon supplies oil to the converter pump 30 via a passageway [not shown]. The transmission pump 61 also supplies oil from a sump in the transmission housing 14 via a passage 62 formed in the housing 14, ports 63, 64, and 65 formed through the ground sleeve 58, the sleeve 59, and the turbine shaft 42, respectively, and an angled passage 66 formed in the inner shaft 46, to a chamber or bore 67 formed in the center of the inner transducer shaft 46. A forward clutch assembly 70 is splined to the output end 72 of the turbine shaft 42, and a mainshaft 74 is splined to the forward clutch hub 76.

The transmission pump 61 additionally supplies oil at line-pressure from the sump in the transmission housing 14 to the modulator valve assembly 24 via a pump discharge line, represented at 78, a conventional pressure regulator 80, and a modulator line 82 extending from the pressure regulator 80 to a port 84 of the modulator valve assembly 24 and, thence, past a metering edge 86 of a land 88 formed on a modulator or pressure-reducing valve 90 slidably mounted in a housing 92 of the modulator assembly 24, to a central chamber 94 therein, the latter serving as a bore for, and being defined axially by the adjacent faces of the land 88 and a second land 96 of the modulator valve 90. A third land 98 is formed on the valve 90 and slidably mounted in an end-chamber 100 formed in the valve housing 92, the end-face of the land 98 serving as a predetermined area for any transducer pressure supplied to the chamber 100, as will be explained.

An outlet port 102 in the valve housing 92 communicates fluid at modulated or torque-reflective pressure from the central chamber 94 to a modulator line consisting of lines 104 and 106 (FIG. 1) leading to a chamber 108 formed in the housing 110 of the shift valve assembly 25. A branchline 112 communicates between the modulator line 104/106 and a chamber 113 of the pressure regulator 80. Still another branchline 114, having a dampening orifice 116 formed therein, communicates between the branchline 112 (or the line 104) and the second end-chamber 118 in the valve housing 92 adjacent the end face of the land 88 of the modulator valve 90. An exhaust port 120, formed adjacent the end-chamber 100, serves to exhaust any leakage of transducer fluid past the land 98 of the modulator valve 90, as well as to exhaust any back-flow of fluid from the shift valve assembly 25 via the passages 106 and 104 and the modulator valve chamber 94.

The bore of the shift valve assembly 25 has slidably mounted therein a valve spool 122 comprising spaced lands 123 and 124, defining a central chamber 125 in the housing 110 and having an exhaust port 126. The valve spool 122 is urged leftwardly in FIG. 1 by a spring 127 mounted in the chamber 108. A line 128 communicates from an end-chamber 130 adjacent the land 124 of the valve spool 122 to the governor 26, the line 106 serving to transfer torque-indicative fluid to the chamber 108 of the housing 110 of the shift valve assembly 25 to control the point at which the shift valve spool 122 operates. Another line 132 communicates between the governor 26 and the forward clutch assembly 70, while a line 134 communicates between the shift valve assembly 25 and the line 132. Still another line 136 communicates between the shift valve assembly 25 and the usual band 138 of the planetary gear system 18.

The torque transducer 22 includes a regulating or pressure-reducing valve 140 (FIGS. 3 and 4), having spaced lands 142 and 144 formed thereon and being slidably mounted in the bore or chamber 67 intermediate respective end-chambers 146 and 148, the latter chamber 148 being larger in diameter than the former chamber 146. A ground spring 150 is mounted between a shoulder 152 formed in the larger chamber 148 and an end-face 154 of a first cam member 156a having oppositely disposed tabs 158 formed thereon. A valve spring 160 is mounted between a pocket 162 formed in the end-face 154 of the cam member 156a and the end 163 of the regulating valve 140. A first pair of oppositely disposed longitudinal slots 164 (FIG. 3) are formed through the wall of the output end 56 of the inner transducer shaft 46. A sleeve 166 is formed on an end-cap 168 so as to fit around the inner transducer shaft 46 at the output end 56 thereof in a counterbore 170 formed in the turbine shaft 42. The open end of the sleeve 166 abuts against a shoulder 171 formed in the bore of the turbine shaft 42 and is retained thereagainst by a bar 172 abutted against the end-cap 168 and press-fitted into a counterbore 173 formed in the end 72 of the turbine shaft 42. A second pair of oppositely disposed longitudinal slots 174 are formed through the wall of the sleeve 166, substantially radially aligned with the slots 164, but with the width of each slot 164 being a predetermined amount less than the width of each slot 174.

Second, third, and fourth axially aligned cam members 156b, 156c, and 156d, respectively, (FIGS. 3, 4, and 7) are mounted in series in the larger end-chamber 148, between the end-cap 168 and the first cam member 156a. As illustrated in FIGS. 3 and 4, oppositely disposed tabs 175, formed on each of the cam members 156b and 156d, extend through the first pair of oppositely disposed longitudinal slots 164 into the second pair of oppositely disposed longitudinal slots 174. Oppositely disposed tabs 176, formed on the cam member 156c, like the tabs 158 of the cam member 156a, extend into the slots 164 but do not reach the slots 174. Cooperating cam surfaces 177 are formed on both sides of each of the two inner cam members 156b and 156c and on one side of each of the two end cam members 156a and 157d.

The edge 178 (FIG. 3) of the land 142 of the regulating valve 140 serves as the metering edge between the linepressure chamber 67, intermediate the lands 142 and 144 and an annular space 180. The transducer pressure thus metered is communicated, in turn, from the annular space 180 to a port 181 formed in the output end 56 of the inner shaft 46, to an annular groove 182 formed around the output end 56, to a port 184 and an annular groove 186 formed in the turbine shaft 42, to aligned openings 188 and 190 formed in the sleeve 59 and the transmission housing 14, to a pocket 192 (FIG. 1) in the housing 14 and, thence, to a transducer-line 194 which leads to an inlet 196 formed in the modulator valve housing 92 where the transducer pressure enters the end-chamber 100. A port 198 (FIG. 3) and a dampening orifice 200 formed in the outlet end 56 of the inner shaft 46 communicate transducer pressure from the annular groove 182 to the smaller end-chamber 146 of the torque transducer 22 to close the loop and thus balance the spring force on the other end 163 of the regulating valve 140.

OPERATION

As is well known, the converter-driven member or turbine 32 is driven by the force of oil imparted thereto by the converter pump 30, the pump 30 being connected for rotation with the engine crankshaft [not shown]by the flexplate 38 and being supplied with oil by the transmission pump 61 which it drives via the sleeve 60 connected thereto. The turbine 32, through its hub 44, the latter being splined to the turbine shaft 42, drives the shaft 42. The shaft 42, in turn, drives the forward clutch assembly 70 which, when engaged, drives the mainshaft 74 in the usual manner.

The input end 48 of the inner transducer shaft 46, being secured to the input end 50 of the turbine shaft 42, through any convenient means, such as the end-cap 52 and bolts 54 (FIG. 2), is caused to rotate with the shaft 42. The output end 56 of the inner transducer shaft 46, being free of the output end 72 of the turbine shaft 42, will rotate independently of the latter. Hence, when the end 72 of the latter shaft 42 is restrained by virtue of the connection with the forward clutch assembly 70, the torque being transmtted therethrough will be reflected by the relative rotation or torsional twist of the free output end 56 of the unloaded inner transducer shaft 46.

A pressure signal which theoretically, is directly proportional to torque, is produced by measuring the relative motion of the output ends 72 and 56 of the shafts 42 and 46, respectively, and converting such measurement into a fluid-pressure signal. Accordingly, it is necessary to first convert the relative rotation of the ends 56 and 72 of the respective twisted inner shaft 46 and the surrounding turbine shaft 42 to a linear displacement.

Referring now to FIGS. 3 and 4, it may be noted that the tabs 175 of the cam members 156*b* and 156*d* are trapped between diagonally-opposed edges of the two longitudinal slots 164 in the inner shaft 46 and the facing edges of the adjacent outer slots 174 in the surrounding tubular sleeve 166, whereas the tabs 158 and 176 of the respective cam members 156*a* and 156*c* extend into the slots 164 only. As torque is applied, the relative rotation of the output ends 56 and 72 causes the inner shaft 46-slot 164 faces to approach the opposing sleeve 166-slot 174 faces, reducing the width of the opening therebetween. As the width is reduced by virtue of the twist of the inner shaft 46 with respect to the stationary outer or turbine shaft 42, the overall length or spread of the axially aligned cam members between the end cam members 156*a* and 156*d* increases due to the camming action of the adjacent respective cam surface 177.

The aligned cam members are abutted at the rear against the end-cap 168, causing the increase or spread in overall length to result in forward (i.e., leftward in FIGS. 3 and 4) translation of all but the rearmost cam member 156*d*. The movement or translation of each translating cam member 156*b* and 156*c* is progressively superimposed on the next succeeding forward or adjacent cam member, with the movement of the forwardmost cam member 156*a* being, in turn, superimposed direction on the valve spring 160. While both springs 150 and 160 are abutted against the cam member 156*a*, the grounded spring 150 acts only to maintain sufficient load on the cam members 156 to ensure smooth, consistent action, and the valve spring 160 exerts a force on the regulating valve 140 in proportion to the first cam member 156*a* translation. The valve 140 is a common pressure-reducing valve, regulating transmission line-pressure from the chamber 67, past the metering edge 178 thereof into the annular space 180, in accordance with the force-balance on the valve 140.

The transducer-pressure thus communicated to the annular space 180 is directed, in turn, via the port 181, the groove 182, the port 184, the annular groove 186, the aligned openings 188 and 190, the pocket 192, and the transducer-pressure passage 194, to the inlet port 196 and, thence, into the modulator valve 90 endchamber 100, where it acts upon the end-face of the modulator valve 90, causing the valve 90 to regulate the line-pressure from the passage 82 and its inlet port 84, past the metering edge 86, into the chamber 94. The modulated or torque-influenced pressure thus produced is thereupon directed out through the port 102 to the modulator-line 104. From the latter line there is a closed-loop action via the lines 106 and 114, the dampening orifice 116, into the end-chamber 118, plus a communication of the modulated pressure via the line 106 into the chamber 108 of the shift valve assembly 25, thus applying a force reflective of torque on the usual 1–2 and/or 2–3 shift valves represented by 25, in lieu of the usual engine vacuum-responsive signal heretofore applied to such valve.

It should be apparent that the invention provides an improved means for accurately measuring a converter's output torque to the transmission in a manner which eliminates the prior need to direct an engine vacuum signal, which may be adversely affected by engine-related difficulties, such as the influence thereon by various exhaust emission control devices, to a vacuum modulator valve, and thence to the shift valves to approximate the output torque.

While but one embodiment of the invention has been shown and described, other modifications thereof are possible.

I claim:

1. A torque-pressure transducer for use with a power train including a torque converter, a clutch, a shift valve, a source of fluid under pressure, a mainshaft, and a hollow turbine shaft operatively connected between said torque converter and said clutch for driving said mainshaft when said clutch is engaged, said torque-pressure transducer comprising a transducer shaft mounted in said hollow turbine shaft and fixedly secured to one end thereof, a chamber formed in the free end of said transducer shaft, an inlet into said chamber for said fluid under pressure, a plurality of axially aligned cam members having alternate cooperating, oppositely contoured cam surfaces formed thereon, each cam member being operatively connected to said transducer shaft and alternate cam members being operatively connected to said turbine shaft so as to be axially spreadable to a variable overall length in said chamber in response to sliding action between adjacent cam surfaces in proportion to the relative torque-responsive twist between said shafts, spring-biased regulating valve means mounted in said chamber and responsive movement of said axially spreadable cam members for regulating said fluid under pressure, and conduitry means communicating said regulated fluid from said regulating valve means to said shift valve.

2. A torque-pressure transducer for use with a power train including a torque converter, a clutch, a shift valve, a source of fluid under pressure, a mainshaft, and a hollow turbine shaft operatively connected between said torque converter and said clutch for driving said mainshaft when said clutch is engaged, said torque-pressure transducer comprising a transducer shaft mounted in said hollow turbine shaft and fixedly secured to one end thereof, a chamber formed in the free end of said transducer shaft, a passage for communicating said fluid under pressure from said source to said chamber, a plurality of cam members mounted in an aligned abutting relationship in said chamber, each adjacent pair of cam members having cooperating cam surfaces and oppositely disposed tabs formed thereon, said tabs being adapted to extend through oppositely disposed openings formed in said transducer shaft and alternately through oppositely disposed, differently sized openings formed in said turbine shaft so as to be relatively rotatable and axially spreadable in said chamber in proportion to the relative torque-responsive twist between said shafts, closed-loop regulating valve means mounted in said chamber, resilient means mounted between the end cam member and said closed-loop regulating valve means, said regulating valve means being responsive through said resilient means to movement of said axially spreadable cam members for regulating said fluid under pressure, conduitry means communicating regulated fluid from said regulating valve means to said shift valve.

3. A torque-pressure transducer for use with a power train including a torque converter, a clutch, a shift valve, a source of fluid under pressure, a mainshaft, and a hollow turbine shaft operatively connected between said torque converter and said clutch for driving said mainshaft when said clutch is engaged, said torque-pressure transducer comprising a transducer shaft mounted is said hollow turbine shaft and fixedly secured to one end thereof, a chamber formed in the free end of said transducer shaft, a passage for communicating said fluid under pressure from said source to said chamber, a plurality of cam members mounted in an aligned abutting relationship in said chamber, each adjacent pair of cam members having cooperating cam surfaces and oppositely disposed tabs formed thereon, said tabs being adapted to extend through oppositely disposed openings formed in said transducer shaft and alternately through oppositely disposed, wider openings formed in said turbine shaft so as to be relatively rotatable and axially spreadable in said chamber in proportion to the relative torque-responsive twist between said shafts, closed-loop regulating valve means mounted in said chamber, first resilient means mounted between the end cam member and a shoulder formed on said transducer shaft for maintaining a predetermined load on said cam members, second resilient means mounted between said end cam member and said closed-loop regulating valve means, said regulating valve means being responsive through said second resilient means to any change in overall lengths of said axially spreadable cam members for regulating said fluid under pressure, closed-loop modulator valve means, first conduitry means communicating regulated fuid from said regulating valve means to said modulator valve means, and second conduitry means communicating modulated fluid from said modulator valve means to said shift valve.

4. A torque-pressure transducer for use with a power train including a torque converter, a clutch, a shift valve, a source of fluid under pressure, a mainshaft, and a hollow turbine shaft operatively connected between said torque converter and said clutch for driving said mainshaft when said clutch is engaged, said torque-pressure transducer comprising a transducer shaft mounted in said hollow turbine shaft and fixedly secured to one end thereof, a chamber formed in the free end of said transducer shaft, a passage for communicating said fluid under pressure from said source to said chamber, a pair of oppositely disposed openings formed in the wall of said transducer shaft, a pair of wider oppositely disposed openings formed in the wall of said turbine shaft, a plurality of axially aligned cam members with adjacent cam member mounted in an abutting, camming relationship in said chamber, each having oppositely disposed tabs formed thereon and extending into said openings formed in said transducer shaft, with said tabs on alternate cam members extending additionally into said openings formed in said turbine shaft so as to be axially spreadable in said chamber as a result of camming action of adjacent cam members in proportion to the relative torque-responsive twist between said shafts as transmitted to said cam members by the edges of said relatively moving turbine and transducer shaft openings, a closed-loop regulating valve mounted in said chamber, a ground spring mounted between the end cam member and a shoulder formed in said transducer shaft for maintaining a predetermined load on said cam members, a valve spring mounted between said end cam member and an end of said closed-loop regulating valve, said regulating valve being responsive through said valve spring to movement of said axially spreadable cam members for regulating said fluid under pressure, an external closed-loop modulator valve, first conduitry means communicating regulated fluid from said regulating valve to said modulator valve, and second conduitry means communicating modulated fluid from said modulator valve to said shift valve.

* * * * *